United States Patent Office 3,780,186
Patented Dec. 18, 1973

3,780,186
ALL-CORN ALIMENTARY PASTE FOODSTUFF
William A. Troy, Park Forest, Ill., assignor to
Swift & Company, Chicago, Ill.
No Drawing. Filed Dec. 2, 1970, Ser. No. 94,616
Int. Cl. A23l 1/16
U.S. Cl. 426—93         12 Claims

ABSTRACT OF THE DISCLOSURE

A process for producing an alimentary corn paste foodstuff suitable for making extrusion or macaroni type products comprising a mixture of substantially equal amounts of regular nongelatinized corn flour and pregelatinized corn flour plus a minor amount of an edible oil or fat as a lubricant, salt, and optional ingredients which mixture may be processed to produce items similar to paste like products made traditionally from certain wheat flours. The corn products thus produced may be cooked, partially cooked, or uncooked.

---

The present invention relates generally to an improved process for producing an alimentary paste foodstuff for extrusion type corn products similar to macaroni, spaghetti, noodles, and other such paste form products. In addition, this invention relates to any resultant extruded and/or pressed configuration in which such corn products may be cooked, partially cooked, or uncooked. More specifically this invention relates to the products and process for corn extrusion products made from a mixture of yellow regular break corn flour and pregelatinized corn flour.

Heretofore, attempts to produce corn alimentary paste type food items have not met with commercial success primarily because the extruded paste product did not possess sufficient cohesive characteristics to form strong or tenacious paste strings which will hang without breaking after being extruded through a press or die. In addition it is well known in the cereal art that undiluted corn pastes are very difficult to mix and to extrude through dies. Objections to previously prepared alimentary corn paste foodstuffs are that they swell excessively in water, tend to exhibit insufficient cohesive characteristics, are too starchy and gummy in texture, and possess excess surface starch which dissolves in the cooking water.

Historically, alimentary macaroni or extruded paste type products have generally been made from Durum or hard wheat flour primarily because of the superior binding qualities and the higher content of special wheat gluten present. Ordinary or soft wheat flour is employed for bread and cake flour. Extrusion or macaroni type products tend to crumble if made from ordinary or soft wheat. Cake and bread made from Durum wheat flour exhibit an undesirable hardness. Ordinary corn flour is somewhat similar to soft wheat flour in that it lacks the necessary binding qualities required for the processing of extrusion foodstuffs. A well-known example of such binding properties is cornbread, which crumbles very easily. However, if corn flour is pregelatinized the starch becomes too elastic and is unsatisfactory for extrusion type foodstuffs because of its tendency to excessively stretch and to overexpand, and to otherwise lose its shape after extrusion due to its inability to maintain a state of equivalence stretch. The binding ingredients of corn are believed to be the interaction between the corn starch and the corn gluten. Compared to Durum wheat, the gluten content present in corn is substantially lower and possesses different binding properties. Therefore, it is seen that the difference between the binding properties of wheat and corn flour are well known to those skilled in the art and that corn flour is generally accepted as possessing unsuitable binding properties for extrusion products.

Therefore, it is a primary object of the present invention to produce an alimentary corn paste composition possessing sufficient cohesive characteristics to produce such extruded products as macaroni, spaghetti, noodles, and other paste form products.

It is another object of the present invention to produce an alimentary corn paste composition suitable for extrusion type foodstuffs and containing a mixture of yellow regular break corn flour and pregelatinized corn flour, a small amount of an edible fat or oil as a lubricant, and minor amounts of optional ingredients.

It is another object of the present invention to produce uncooked, cooked, and partially cooked extrusion products made exclusively from flour derived from corn.

It is another object of the present invention to produce uncooked, cooked, and partially cooked extrusion products made from a mixture of regular nongelatinized corn flour and pregelatinized corn flour, both with and without other optional ingredients.

It is another object of the present invention to provide a process for producing an alimentary paste suitable for making extrusion products, said paste being made from a mixture of nongelatinized corn flour and pregelatinized corn flour.

Additional objects of the present invention, if not sufficiently set forth herein, will be readily apparent to those skilled in the art from a reading of the following detailed description of the invention.

In general the compositions which are the subject of the present invention relate to corn alimentary paste products prepared by a combintion of a nongelatinized corn flour such as yellow regular break corn flour and pregelatinized corn flour. More particularly the preferred embodiment of the present invention relates to a corn alimentary paste product containing the following as primary ingredients:

|  | Percent | |
| --- | --- | --- |
|  | Range | Preferred |
| Yellow regular break corn flour (nongelatinized) | 34–42 | (38) |
| Pregelatinized corn flour | 34–42 | (38) |
| Water | 19–24 | (21) |
| Edible oils | ¾–3 | (1–1½) |
| Salt | ¾–3 | (1–1½) |

In general, the method of the present invention involves the normal milling procedures of yellow corn wherein the starting material is field-dry yellow whole corn kernels. The corn is generally tempered in cold water for about 1–2 hours and then pressed through a degermer which separates the hulls, the germs, and the endosperm or hominy grits. The hominy grits are ground into flour which is generally referred to as "yellow regular break corn flour" and which for convenience will be referred herein as "nongelatinized corn flour."

"Pregelatinized corn flour" is obtained by tempering the hominy grits with cold water for 1–2 hours and then being crushed by pressing through heated steel rollers. The product produced by the rolling process is usually referred to as pregelatinized corn flakes, which may be ground into flour. The term "pregelatinized" refers to the cooking of from about 50 to about 100% of the corn starch in the product. The primary physical distinction between nongelatinized and pregelatinized corn flour is the product density. The more gelatinization the less density. The preferred range of the pregelatinization for the present invention is about 80%. It is believed that the unique binding properties of the instant composition is the interaction of the corn gluten with the corn starch which is both pregelatinized and nongelatinized.

Corn flour is more difficult to extrude through a die than is wheat flour, and it has been found that the addition of small amounts of most any edible oil or fat from either animal or vegetable origins to these corn pastes materially aids their extrusion and forming properties. Corn oil, for example, has been found to be particularly suitable for this purpose.

The composition of the two major components of this invention may be approximated as follows:

| Yellow regular break corn flour (nongelatinized), percent | | | | |
|---|---|---|---|---|
| Moisture | Minimum | 11.5 | Maximum | 13.5 |
| Protein | do | 5.5 | do | 7.5 |
| Fiber | do | 0.3 | do | 0.7 |
| Fat | do | 1.0 | do | 1.75 |
| Ash | do | 0.3 | do | 0.7 |
| Pregelatinized corn flour, percent | | | | |
| Moisture | Minimum | 6.5 | Maximum | 12.0 |
| Protein | do | 5.0 | do | 9.0 |
| Fiber | do | 0.3 | do | 0.7 |
| Fat | do | 0.5 | do | 1.0 |
| Ash | do | 0.3 | do | 0.7 |

The U.S. patent to Gent, No. 466,230 issued Dec. 29, 1891 discloses a corn paste product consisting of 100% pregelatinized corn flake flour which is found to possess the properties referred to as in the prior art; namely, that the extruded paste tends to be too elastic to retain its shape when extruded, swells excessively during cooking, and gives off a heavy starchy residue in the cooking water which is unappealing in both appearance and odor and which contaminates other foods with which it may be cooked. These properties are the reason why all corn spaghetti-type foodstuffs have never gained commercial acceptance. The U.S. patent to Felice, No. 3,082,092 issued Mar. 19, 1963 discloses that alimentary paste products containing corn flour in an amount of 25% or more of the wheat flour are wholly unsatisfactory as not possessing sufficient cohesive properties.

In the present invention it has been discovered that the addition of a small or lubricating amount of an edible fat or oil, of either vegetable or animal origin, e.g. corn oil, substantially enhances the extrusion properties of all corn paste products. It was further found that blends of from about 34 to about 42% of pregelatinized corn flour with a substantially equal amount of regular nongelatinized corn flour both having from about 6 to about 14% moisture content preferable about 12%, in the dried product, produced a satisfactory stable product having an unusually attractive rich golden color.

It is understood that several optional ingredients may be added to enhance the basic mixture of pregelatinized and nongelatinized corn flour but which are not essential to the practice of the present invention. For example, vitamins and minerals may be incorporated in the above formula on the per pound basis of the finished dried product as follows:

| Thiamine, mg | Minimum | 4.0 | Maximum | 5.0 |
|---|---|---|---|---|
| Rivoflavin, mg | do | 1.7 | do | 2.2 |
| Niacin or niacinamide, mg | do | 27.0 | do | 34.0 |
| Iron, mg | do | 13.0 | do | 16.5 |

In addition, egg whites up to about 5% are particularly useful in adding to the cohesive properties of the final product.

Obviously many modifications and variations of the invention as hereinbefore set forth may be made without departing from the spirit and scope thereof, and, therefore, only such limitations should be imposed as are indicated in the appended claims.

I claim:

1. A process of making a spaghetti-type all-corn foodstuff comprising:
    combining from about 34 to 43% dry weight of pregelatinized corn flour with substantially an equal quantity of nongelatinized corn flour;
    mixing the combined corn flour with sufficient water to produce a paste of extrudable consistency and with a minor amount of an edible oil or fat as a lubricant;
    extruding the paste into any desired spaghetti-type configuration; and
    thereafter drying the uncooked product.

2. In the method of claim 1 wherein the paste is extruded to form a macaroni product.

3. In the method of claim 1 wherein the paste is extruded to form a spaghetti product.

4. In the method of claim 1 wherein the paste is extruded to form a noodle product.

5. In the method of claim 1 wherein the formed and dried product is cooked in hot water.

6. In the method of claim 5 wherein the dried product is cooked in combination with the processing of other food products.

7. In the method of claim 1 wherein from about 50 to 100% of the starch of the pregelatinized flour is gelatinized.

8. In the method of claim 7 wherein about 80% of the starch of the pregelatinized flour is gelatinized.

9. An uncooked, all-corn spaghetti-type foodstuff comprising:
    from about 34 to about 42% dry weight of a pregelatinized corn flour and a substantially equal amount of a nongelatinized corn flour;
    to about 3% dry weight of the flour of an edible oil fat as a lubricant; and
    the remainder comprising suitable amounts of salt, moisture and nutritional supplements.

10. In the product of claim 9 wherein the pregelatinized corn flour contains from about 50 to about 100% gelatinized corn starch.

11. In the product of claim 10 wherein the pregelatinized corn flour contains about 80% gelatinized corn starch.

12. An uncooked extruded, spaghetti-type foodstuff comprising: 34–42% pregelatinized corn flour; 34–42% yellow regular nongelatinized corn flour; 6–14% water; ¾–3% edible oils; and ¾–3% salt.

References Cited
UNITED STATES PATENTS

| 3,580,727 | 5/1971 | Gulstad | 99—81 |
|---|---|---|---|
| 3,615,677 | 10/1971 | Scharschmidt et al. | 99—85 |

RAYMOND N. JONES, Primary Examiner

J. R. HOFFMAN, Assistant Examiner

U.S. Cl. X.R.

426—158, 516